United States Patent [19]

Takahashi

[11] Patent Number: 4,781,079

[45] Date of Patent: Nov. 1, 1988

[54] DIFFERENTIAL CASE

[75] Inventor: Hirotake Takahashi, Saitama, Japan

[73] Assignee: Honda Giken Kogyo Kabushiki Kaisha, Tokyo, Japan

[21] Appl. No.: 888,735

[22] Filed: Jul. 21, 1986

[51] Int. Cl.[4] ............................................. F16H 1/44
[52] U.S. Cl. ...................................... 74/711; 74/710; 74/713
[58] Field of Search ...................... 74/710.5, 711, 710, 74/713

[56] References Cited

U.S. PATENT DOCUMENTS

| | | | |
|---|---|---|---|
| 1,396,225 | 11/1921 | Logue et al. | 74/711 |
| 1,499,467 | 7/1924 | Mead | 74/711 |
| 2,397,374 | 3/1946 | Schlicksupp | 74/711 |
| 2,817,251 | 12/1957 | Stamm | 74/711 |
| 3,264,900 | 8/1966 | Hartupee | 74/711 |
| 3,362,258 | 1/1968 | Thornton | 74/711 |
| 3,987,689 | 10/1976 | Engle | 74/711 |
| 4,123,951 | 11/1978 | Kagata | 74/711 |
| 4,245,525 | 1/1981 | LeBegue | 74/711 |

FOREIGN PATENT DOCUMENTS

| | | | |
|---|---|---|---|
| 1903126 | 9/1969 | Fed. Rep. of Germany | 74/710.5 |
| 2038137 | 2/1972 | Fed. Rep. of Germany | 74/711 |
| 106745 | 6/1984 | Japan | 74/711 |
| 1120132 | 10/1984 | U.S.S.R. | 74/711 |
| 1260168 | 1/1972 | United Kingdom | 74/711 |

Primary Examiner—Leslie A. Braun
Assistant Examiner—Dwight G. Diehl
Attorney, Agent, or Firm—Irving M. Weiner; Joseph P. Carrier; Pamela S. Burt

[57] ABSTRACT

A differential case with a limited-slip mechanism includes a pair of axles held in coaxial relation to each other, a pair of side gears mounted respectively on inner ends of the axles, pinions interposed between and held in mesh with the side gears, a case housing the side gears and the pinions therein and supported on the axles, and a clutch mechanism interposed between the case and each of the side gears and including a plurality of discs arranged for mutual frictional engagement. The case comprises a central cylindrical body having opposite open ends and caps attached to the opposite open ends. The central cylindrical body has grooves extending axially thereof and defined in an inner peripheral surface thereof at at least one of the opposite ends, the discs having portions engaging in the grooves for preventing rotation of the discs. The caps and the one-piece central cylindrical body may be made of different materials.

4 Claims, 2 Drawing Sheets

DIFFERENTIAL CASE

BACKGROUND OF THE INVENTION

1. Field of the Invention

The present invention relates to a differential case, and more particularly to a differential case for a differential equipped with a limited-slip mechanism 2. Description of the Relevant Art Japanese Patent Publication No. 49(1974)-9848, for example, discloses a limited-slip differential in which differential pinions and side gears are housed in a differential case, and a multiple-disc clutch is interposed between each side gear and the differential case. The differential case has grooves defined axially in an inner peripheral surface thereof for preventing the rotation of and allowing the axial sliding movement of friction discs of the multiple-disc clutch.

The differential case comprises a bottomed cylindrical case body and a cover coupled to the open end of the case body. With the differential case thus assembled of two members, however, one end of each of the grooves that extend the full axial length of the differential case is positioned at the bottom of the differential case. Therefore, it is difficult to form these grooves by broaching, and the grooves must be formed by a more complex machining process. According to one disclosed design, friction discs are disposed only in the vicinity of the open end of the case body while no friction discs are positioned at the bottom thereof.

Another problem associated with the disclosed differential case is that it is subject to a higher surface pressure at the groove sections than at bearing sections by which drive shafts are rotatably supported on the differential case. Consequently, the material of the bottomed cylindrical case body must be selected to meet the mechanical strength which is required by the groove sections.

The present invention has been made in an effort to solve the aforesaid problems of the conventional differential case.

SUMMARY OF THE INVENTION

According to the present invention, there is provided a differential case with a limited-slip mechanism which includes a pair of axles held in coaxial relation to each other, a pair of side gears mounted respectively on inner ends of the axles, pinions interposed between and held in mesh with the side gears, a case housing the side gears and the pinions therein and supported on the axles, and a clutch mechanism interposed between the case and each of the side gears and including a plurality of discs arranged for mutual frictional engagement. The case comprises a central cylindrical body having opposite open ends and caps attached to the oppoiste open ends. The central cylindrical body has grooves extending axially thereof and defined in an inner peripheral surface thereof at at least one of the opposite ends, while the discs having portions engaging in the grooves for preventing rotation of the discs.

It is, therefore, an object of the present invention to provide a differential case for a differential with a limited-slip mechanism, in which differential case grooves can easily be defined by simultaneously broaching an inner peripheral surface at axially opposite ends of the differential case.

Another object of the present invention is to provide a differential case for a differential with a limited-slip mechanism, which differential case includes drive-shaft bearing sections that are mechanically less strong than groove sections and that can be made of a material differential from that of the groove sections.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is an end view of a central body of the differential case of the present invention; and FIG. 4 is a cross-sectional view taken along line IV—IV of FIG. 3.

DETAILED DESCRIPTION OF THE PREFERRED EMBODIMENT

Figure 2:
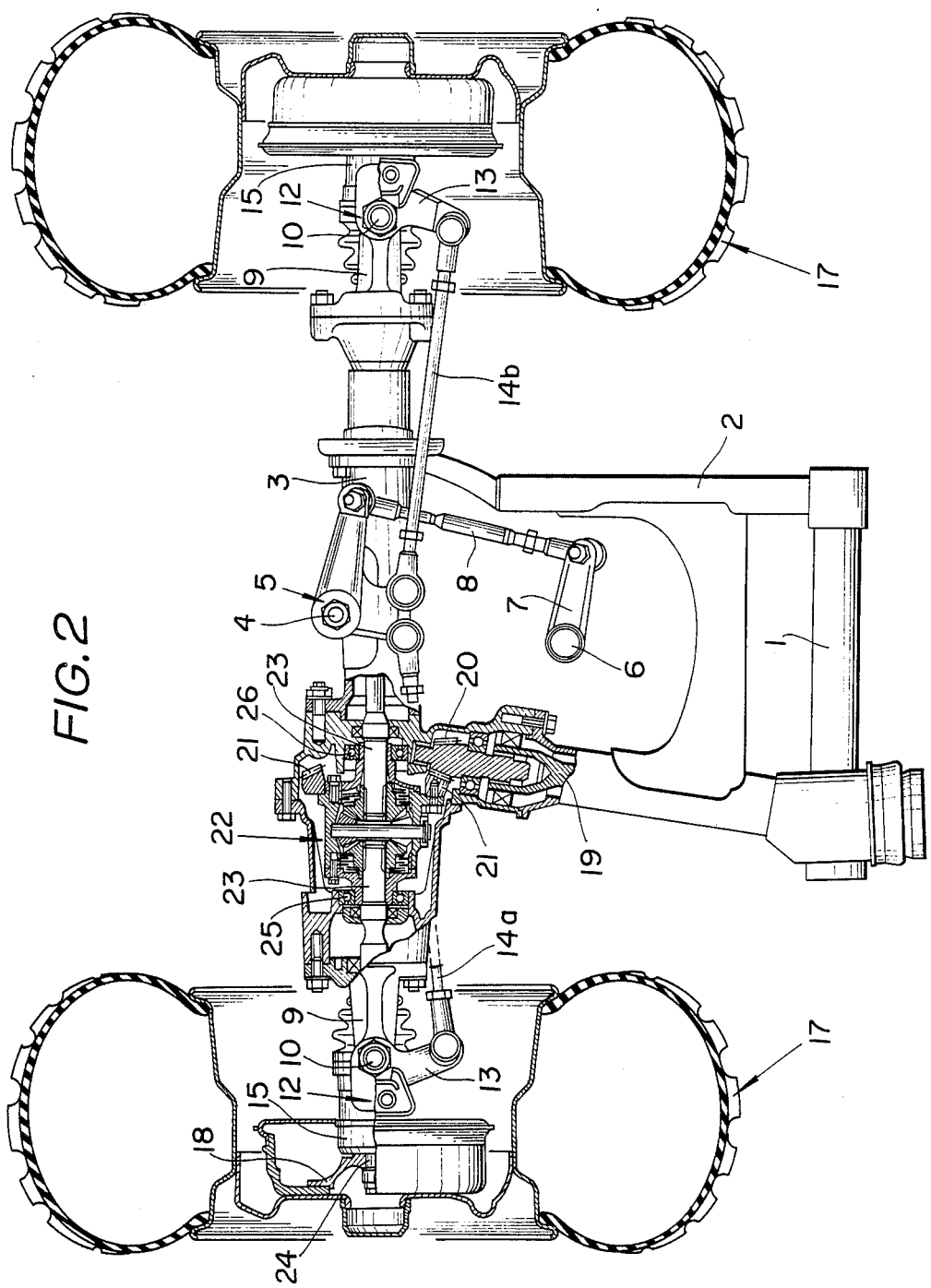
FIG. 2 is a plan view of driving and stearing systems for steerable drive wheels with an axle housing which accommodates the differential of FIG. 1 (being shown in horizontal cross section)

FIG. 2 shows driving and steering systems for steerable drive wheels on a four-wheel buggy having a riding saddle. The buggy includes a vehicle frame 1 with a swing arm 2 being vertically swingably mounted on a front end thereof. An axle housing 3 is supported on the front end of the swing arm 2. A steering pivot arm 5 is horizontally pivotally mounted by an upward pivot shaft 4 on the upper surface of a longitudinally central portion of the axle housing 3.

A vertically extending steering shaft 6 which is coupled to a steering handlebar (not shown) is disposed behind the steering pivot arm 5, and joined to an arm 7 that is angularly movable in a horizontal plane in unison with the steering shaft 6. The arm 7 is operatively coupled by a drag link 8 to the steering pivot arm 5 so that the arm 7 and the steering pivot arm 5 will be turned in the same direction.

A knuckle holder 9 is fixed to each of the opposite ends of the axle housing 3, and a knuckle 12 is mounted on the knuckle holder 9 by a kingpin 10. The knuckles 12 on the respective knuckle holders 9 have rear extensions 13 operatively coupled to the steering pivot arm 5 by tie rods 14a, 14b, respectively. Each of the knuckles 12 has an outwardly projecting sleeve in which a hub 18 of a wheel 17 is rotatably supported.

The swing arm 2 is substantially aligned in parallel with a drive shaft 19 operatively coupled to two axles 23 by a driver pinion 20, a driven ring gear 21, and a differential gear mechanism 22. The axles 23 have outer ends each extending into the knuckle holder 9 and coupled to a spindle through a constant-velocity joint. The spindle is splined to the inner peripheral surface of the hub 18 for driving the wheel 17.

Figure 1:
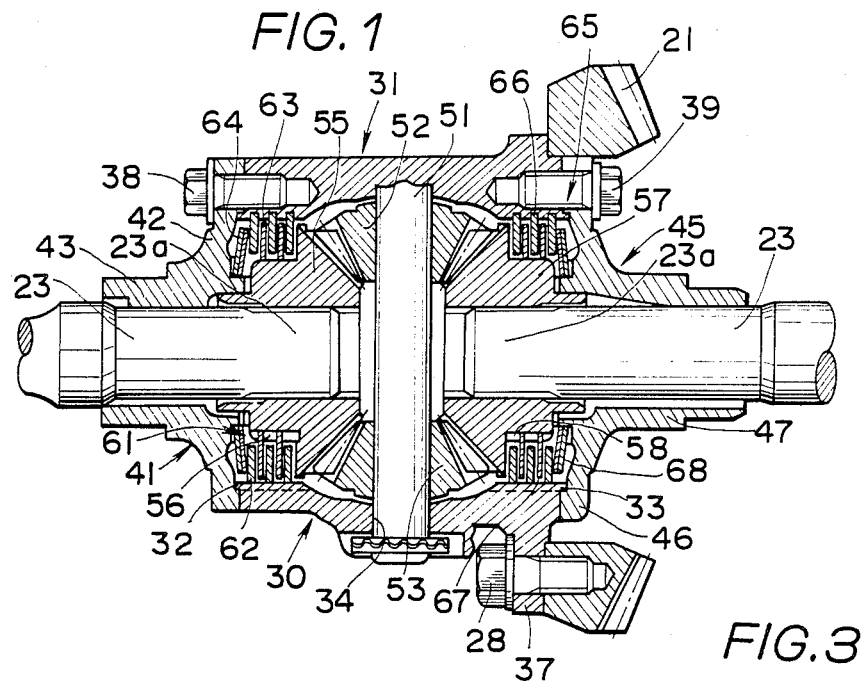
FIG. 1 is a cross-sectional view of a limited-slip differential housed in a differential case according to the present invention, the view being taken along line I—I of FIG. 3.

As illustrated in FIG. 1, the driven ring gear 21 meshing with the driver pinion 20 is integral with a differential case 30 constructed of three components. More specifically, the differential case 30 comprises a one-piece central cylindrical body 31 which is open at its opposite ends, and two caps 41, 45 coupled respectively to the opposite ends of the central cylindrical body 31. As shown in FIGS. 3 and 4, spline grooves 32, 33 are defined on the inner peripheral surface of the central body 31 at the axially opposite ends thereof. The spline grooves 32, 33 are preferably formed by simultaneous broaching. The central body 31 has two diametrically opposite shaft holes 34, 35 defined radially through an axially central portion thereof, and a plurality of radial attachment bosses 37 on an outer peripheral surface at one axial end thereof. The ring gear 21 is securely attached to the attachment bosses 37 by means of bolts 28.

A pinion shaft 51 is inserted through the shaft holes 34, 35 of the central body 31 and between confronting inner ends 23a of the axles 23, and differential pinions 52, 53 are mounted on the pinion shaft 51 in the central body 31 at axially opposite ends of the pinion shaft 51. Two side gears 55, 57, which are rotatable in unison with the axles 23, are held in mesh with the differential pinions 52, 53 and mounted respectively on the inner ends 23a of the axles 23 in the central body 31. The side gears 55, 57 have spline grooves 56, 58, respectively, defined in outer peripheral surfaces at outer ends thereof.

A plurality (three in the illustrated embodiment) of axially spaced friction discs 62 are disposed in the central body 31 and have outer peripheral edges engaging in the grooves 32 at one end of the central body 31. Similarly, plurality (three in the illustrated embodiment) of axially spaced friction discs 66 are disposed in the central body 31 and have outer peripheral edges engaging in the grooves 33 at the opposite end of the central body 31. Clutch plates 63 alternate with the friction discs 62 and have inner peripheral edges engaging in the grooves 56 of the side gear 55, and likewise clutch plates 67 alternate with the friction discs 66 and have inner peripheral edges engaging in the grooves 58 of the side gear 57.

The caps 41, 45 have respective flanges 42, 46 and respective sleeve bearings 43, 47 disposed centrally on the flanges 42, 46, respectively. The flanges 42, 46 are coupled to the axial outer ends of the central body 31 by means of bolts 38, 39. A Belleville spring 64 is interposed between the flange 42 and the outermost friction disc 62, and a Belleville spring 68 is interposed between the flange 46 and the outermost friction disc 66.

Thus, the friction discs 62, 66, the clutch plates 63, 67, and the Belleville springs 64, 68 jointly constitute multiple-disc clutches 61, 65 disposed between the side gears 55, 57 and the differential case 30.

As illustrated in FIG. 2, the differential case 30 with the multiple-disc clutches 61, 65, the side gears 55, 57, and the differential pinions 52, 53 assembled therein is rotatably supported by bearings 25, 26 in the axle housing 3 which are mounted respectively on the bearing-sleeves 43, 47 of the caps 41, 45. The drive shafts 23 extend through the bearingsleeves 43, 47 and have their axially confronting inner ends 23a fitted respectively in the side gears 55, 57.

As described above, the differential case 30 is composed of the central cylindrical body 31 and the two caps 41, 45, and the grooves 32, 33 for preventing the rotation of and allowing the axial sliding movement of the friction discs 62, 66 are defined in the inner peripheral surface of the central cylindrical body 31 at its axially opposite ends. Therefore, these grooves 32, 33 can easily be formed simultaneously by broaching, and such a machining process is much more efficient than that which has heretofore been employed to form these grooves.

Since the differential case 30 is constructed of three separable components, the caps 41, 45, having the bearing-sleeves 43, 47 which support the drive shafts 23 and may be less mechanically strong than the portions defining the grooves 32, 33, may be made of a material different from the material of the central cylindrical body 31.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A differential case with a limited-slip mechanism, comprising:

a pair of axles held in coaxial relation to each other;

a pair of side gears mounted respectively on inner ends of said axles;

pinions interposed between and held in mesh with said side gears;

a case housing said side gears and said pinions therein and supported on said axles;

a clutch mechanism interposed between said case and each of said side gears and including a plurality of discs arranged for mutual frictional engagement;

said case comprising a one-piece central body having opposite open ends and caps attached to said opposite open ends, said central cylindrical body having grooves extending axially thereof and defined in an inner peripheral surface thereof on at least one of said opposite ends, said discs having portions engaging in said grooves for preventing rotation of said discs.

2. A differential case according to claim 1, wherein said caps are fixed to said central cylindrical body by means of bolts.

3. A differential case according to claim 1, wherein said caps are made of a material different from a material of said central cylindrical body.

4. A differential case according to claim 3, wherein the material of said caps is of smaller mechanical strength than that of the material of said central cylindrical body.

* * * * *

UNITED STATES PATENT AND TRADEMARK OFFICE
CERTIFICATE OF CORRECTION

PATENT NO. : 4,781,079

DATED : November 1, 1988

INVENTOR(S) : Hirotake Takahashi

It is certified that error appears in the above-identified patent and that said Letters Patent is hereby corrected as shown below:

On the title page, after "[22] Filed: Jul. 21, 1986" insert
--[30] Foreign Application Priority Data
  July 19, 1985 [JP] Japan ......60-159733--

Column 1, line 4, change "differential" to --different--

Column 1, line 16, change "stearing" to --steering--

Column 3, line 26, after the comma insert --a--

Column 3, line 52, after "bearing" delete the hyphen

Column 3, line 54, change "bearingsleeves" to --bearing sleeves--

Column 4, line 12, before "sleeves" delete the hyphen

Column 4, line 40 (claim 1, line 13), after "central" insert
--cylindrical--

Signed and Sealed this

Twenty-third Day of May, 1989

*Attest:*

DONALD J. QUIGG

*Attesting Officer*  *Commissioner of Patents and Trademarks*